US006234106B1

(12) United States Patent

Dohnal et al.

(10) Patent No.: US 6,234,106 B1

(45) Date of Patent: May 22, 2001

(54) POSITION INDICATOR

(75) Inventors: Dieter Dohnal, Lappersdorf; Josef Neumeyer, Deuerling, both of (DE)

(73) Assignee: Maschinenfabrik Reinhausen GmbH, Regensburg (DE)

( * ) Notice: Subject to any disclaimer, the term of this patent is extended or adjusted under 35 U.S.C. 154(b) by 0 days.

(21) Appl. No.: 09/308,009

(22) PCT Filed: Jan. 9, 1998

(86) PCT No.: PCT/EP98/00092

§ 371 Date: May 11, 1999

§ 102(e) Date: May 11, 1999

(87) PCT Pub. No.: WO98/38662

PCT Pub. Date: Sep. 3, 1998

(30) Foreign Application Priority Data

Feb. 25, 1997 (DE) ........................................ 197 07 528

(51) Int. Cl.[7] ........................................ G01D 13/00

(52) U.S. Cl. ........................ 116/284; 116/288; 116/293; 116/296

(58) Field of Search .............................. 116/284, 286, 116/287, 288, 293, 294, 295, 297, 300, 301, 299, 296; 340/525, 461, 815.78, 815.86, 815.87, 815.47; 362/23, 485, 486, 487; 368/80, 228, 16, 19

(56) References Cited

U.S. PATENT DOCUMENTS

| | | | | |
|---|---|---|---|---|
| 1,050,542 | * | 1/1913 | Jaberg | 368/80 |
| 1,459,710 | * | 6/1923 | Balch | 368/106 |
| 2,706,962 | * | 4/1955 | Kebbon | 368/16 |
| 2,848,973 | * | 8/1958 | Stiens | 116/293 |
| 3,016,038 | * | 1/1962 | Stiens | 116/293 |
| 3,041,997 | * | 7/1962 | Hartwell | 116/293 |
| 4,389,122 | * | 6/1983 | Dubois et al. | 368/110 |
| 4,597,673 | * | 7/1986 | Kihara | 368/80 |
| 4,766,579 | * | 8/1988 | Sporring | 368/190 |
| 5,724,317 | * | 3/1998 | Kubota et al. | 368/11 |
| 5,793,708 | * | 8/1998 | Schmidt et al. | 368/106 |
| 5,802,016 | * | 9/1998 | Kubota et al. | 368/11 |
| 5,956,294 | * | 9/1999 | Takizawa et al. | 368/37 |
| 5,977,868 | * | 11/1999 | Itakura | 340/438 |

FOREIGN PATENT DOCUMENTS

| | | | | |
|---|---|---|---|---|
| 34 11 293 | | 10/1995 | (DE) . | |
| 2230624 | * | 4/1990 | (GB) | 368/19 |

* cited by examiner

*Primary Examiner*—Jacob K. Ackun, Jr.
*Assistant Examiner*—Faye Francis
(74) *Attorney, Agent, or Firm*—Herbert Dubno; Andrew Wilford

(57) ABSTRACT

A position indicator for a motor drive for actuating a step switch, tap changer, or dipping coil, has a display board having front and back faces and a first circular array of symbols on the front face corresponding to individual switching phases traversed during changeover of the motor drive from one operational position into another neighboring operational position. A first shaft extending through the board centrally of the first array and defining a first axis carries a pointer at the front face rotatable about the first axis through positions aligned with the symbols. A second circular array of symbols on the front face is associated with individual possible stationary operational positions of the step switch, the tap changer, or the dipping coil. A second pointer shaft projecting through the board centrally of the second array and defining a second axis carries a second pointer at the front face rotatable about the second axis through positions aligned with the symbols of the second array. Respective trailing pointers pivotal on the second axis and not driven by the second shaft flank the second pointer and have entrainment formations engageable therewith. Thus as the second pointer moves and engages either of the pointers it displaces same. A gear mechanism on the back face connects the second shaft to the first shaft for movement of the second pointer angularly codirectionally with the first pointer between adjacent symbols of the second display on rotation of the first pointer through 360°.

2 Claims, 2 Drawing Sheets

POSITION INDICATOR

CROSS REFERENCE TO RELATED APPLICATIONS

This application is the U.S. national phase of PCT application PCT/EP98/00092 filed Jan. 9, 1998 with a claim to the priority of German patent application 19707528.2 itself filed Feb. 25, 1997.

FIELD OF THE INVENTION

The invention relates to a position indicator of a motor drive for the actuation of a step switch, of a tap changer or of a dipping coil.

BACKGROUND OF THE INVENTION

Such a position indicator is already known from the internal company paper "Motorantriebe MA 7, Betriebsanweisung" [translated: Motor Drive MA 7, Operation Instructions", translator's note], Impressum BA 40/90 de-0391/2000 of the applicant.

Thereby the position indicator is designed as a direct integral component of the controlling gear. There are a switching-phase indicating disk and a position indicating disk, both of which are actuated within the controlling gear. The position display itself is done through the indicia arranged on the frontal, i. e. peripheral side of the respective disk, which turn together with this disk. The frontal sides are visible from the outside in a certain area and the thereon displayed indicia are readable.

The switching-phase indicating disk rotates just like the eccentric disk of the controlling gear, which actuates the individual contacts in a predetermined switching sequence, each time the step switch is switched from one phase or the like to another neighboring phase, each time by a full rotation.

On its frontal side it is provided with indicia which represent, respectively illustrate with digits or other symbols, the individual switching phases, i.e. switching sequence taking place one after the other during a switch.

A green field indicates the rest position of the cam switch.

The starting point of a switching phase, i.e. the stationary state of the motor drive, is represented by a red central mark within the green area.

The position-indicating disk is provided on its frontal side with digits or the like, which correspond to the possible switch position of the respective step switch or the like.

The position indicating disk rotates each time there is a switch from one step of the step switch to a neighboring other step, each time by an angle, i.e. by a phase which corresponds to the distance between two neighboring indicia.

Thus by means of the switching-phase indicator disk, the known position indicator shows each time in which area of the switching sequence the motor drive is located at that time, during a switch.

Further by means of the position-indicating disk it also indicates the operational position wherein the drive motor is located (in the stationary state).

The disadvantage of this known position indicator is the poor visual representation of the switching operation, i.e. of the respective switching sequence to be passed. It is not easy to recognize whether an initiated switching operation is in its initial stage or close to its completion.

A further disadvantage consists in that the displays, which as already explained are located on each of the frontal sides of the two disks can not be read from a greater distance. Since both disks are components of the controlling gear and the frontal discs can not be made as thick as desired, an enlargement of the digits or of other symbols is precluded by the construction conditions.

A further disadvantage of the known position indicator consists in that it can not indicate which operational positions have already been assumed during the preceding actuation of the motor drive, i.e. which control range of the step switch or the like has been used up to the present point in the practical operation, if at all. However such information is of increasing importance for service, setting and monitoring functions. It is important to know for instance whether a step switch was switched through its entire control range or it was operated basically only in a narrowly limited area, and whether this narrowly limited area is in a given case close to one of the end positions. All this information can not be obtained from the known position indicator.

OBJECTS OF THE INVENTION

It is the object of the invention to provide a generic position indicator, which offers a good visual representation of information, easy readability from great distances and additional information about the control ranges traversed in the past.

SUMMARY OF THE INVENTION

According to the invention, this object is attained in a position indicator for a motor drive for actuating a step switch, tap changer, or dipping coil, the position indicator. The position indicator according to the invention has a display board having front and back faces, a first circular array of symbols on the front face corresponding to individual switching phases traversed during changeover of the motor drive from one operational position into another neighboring operational position, a first shaft extending through the board centrally of the first array and defining a first axis, and a pointer on the shaft at the front face rotatable through positions aligned with the symbols. A second circular array of symbols on the front face associated with individual possible stationary operational positions of the step switch, the tap changer, or the dipping coil surrounds a second pointer shaft projecting through the board centrally of the second array and defining a second axis. A second pointer at the front face on the second shaft is rotatable through positions aligned with the symbols of the second array. Respective trailing pointers pivotal on the axis and not driven by the second shaft flank the second pointer and have entrainment formations engageable therewith so that as the second pointer moves and engages either of the pointers it displaces same. A gear mechanism on the back face connects the second shaft to the first shaft for movement of the second pointer angularly codirectionally with the first pointer between adjacent symbols of the second display on rotation of the first pointer through 360°.

An advantage of the position indicator according to the invention consists in that the entire display is uncoupled from the controlling gear; separate display dials and pointers sweeping the same for position indication are provided.

A further advantage of the position indicator of the invention consists in that due to the selected pointer arrangement, the display is generally more eye-catching, clearer and easier to recognize.

The pointers used for the display offer a better overview about the relation of the present operational position within the entire control range. At a single glance it offers the information whether the associated step switch or the like is in the middle or at the upper or lower end of its work range. Furthermore the selected pointer arrangement offers a better overview of the time lapse of the respective switch, the corresponding pointer gives an easily recognizable overview as to the present stage wherein the motor drive can be found during a switch within the sequence to be traversed.

The trailing pointers provided according to the invention as a component of the position display give at a glance the information in which control range, i.e. with which operation positions the step switch or the like has been so far operated.

The size, shape, color and the symbol writing of the dials and the pointers can be easily adjusted to the respective requirements. The display by means of circular dials and pointers is also more familiar to the human eye and produces fewer reading errors than the necessarily smaller symbols on the frontal sides of the disks according to the state of the art.

BRIEF DESCRIPTION OF THE DRAWING

Subsequently the invention will be even closer described with the aid of the example represented in the drawing.

SPECIFIC DESCRIPTION

Figure 1:
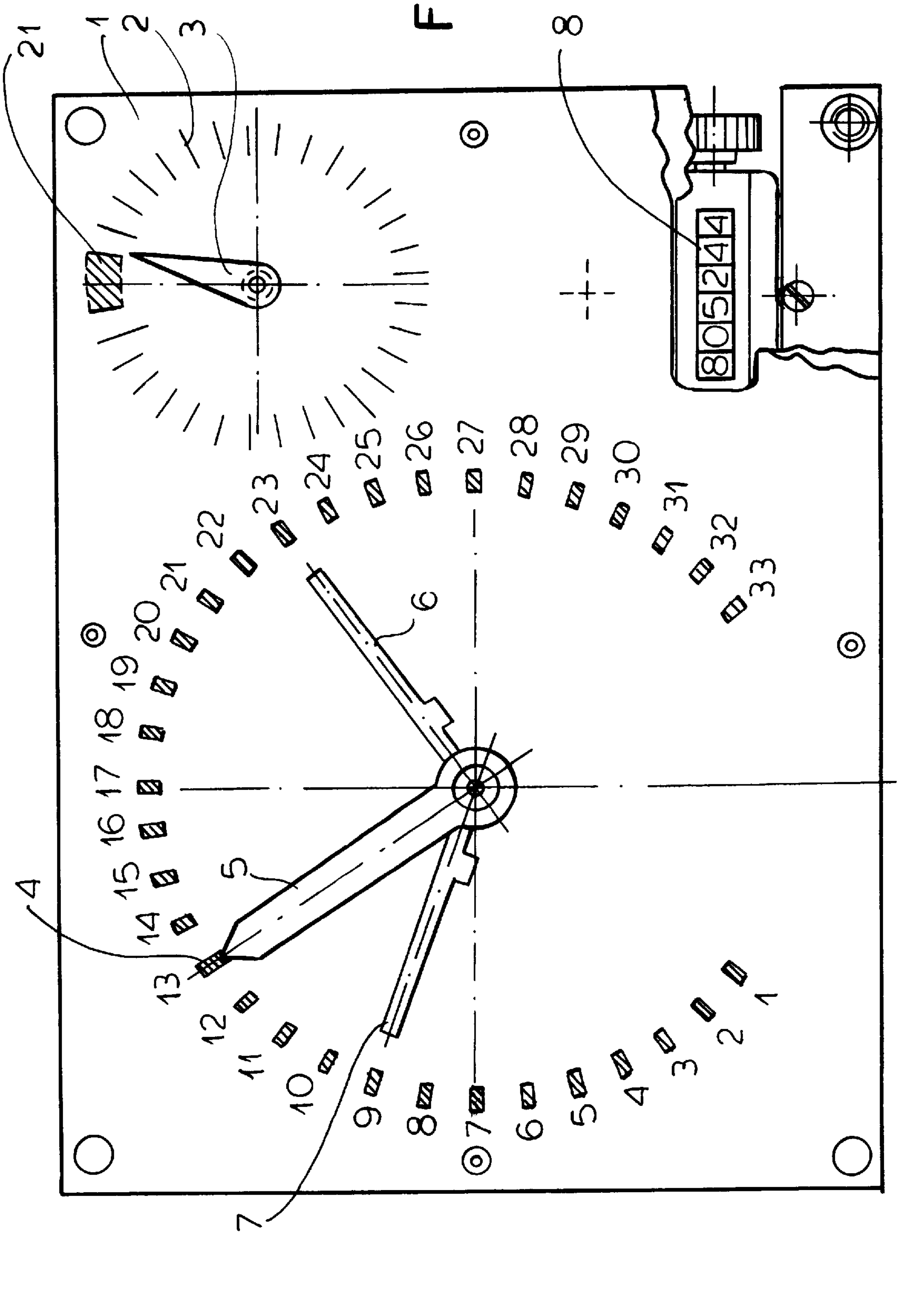
FIG. 1 shows a frontal view of a position indicator according to the invention
Figure 2:
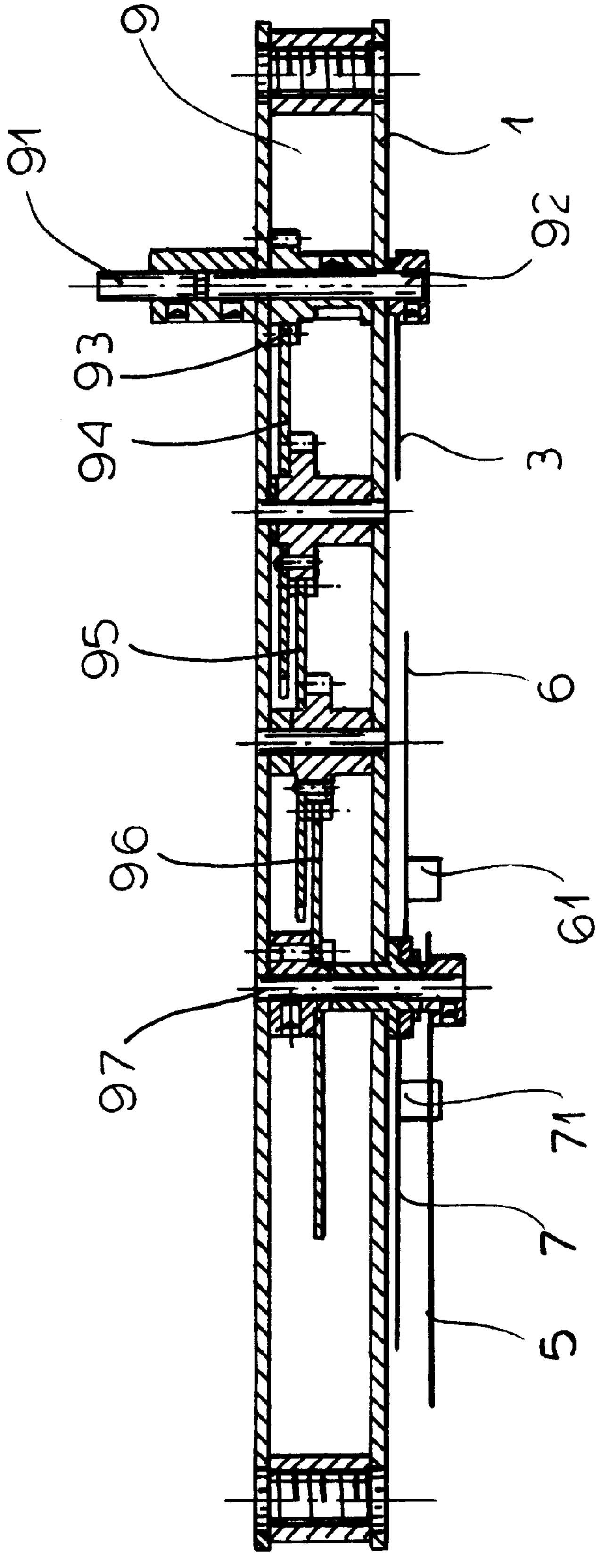
FIG. 2 shows a cross section through this position indicator.

On a display board 1 a first circular dial 2, the phase dial, is provided. On this dial 2 at equal distances from each other symbols are provided which correspond to the individual switching phases, which have to be traversed in succession during a switch, i. e. correspond to the individual phases of the switching sequence. This symbols can be simple lines, digits or other graphic signs.

A dial area 21 of the first dial 2, corresponding to the range wherein the cam switch of the controlling gear is in a rest position, is specially marked—possibly in colors—. Centrally within this first dial 2 a first pointer 3, the switching phase pointer, is rotatably arranged on a first pointer shaft 92 passing through the display board 1. By means of a display gear mechanism 9 which has still to be described, at each switch it is rotated by 360 degrees, whereby it traverses one after the other, respectively sweeps over all symbols of the first dial 2, thereby giving an indication about the instant position of the motor drive during a switch.

The rotation direction of the first pointer 3 depends on the rotation direction of the motor drive. In the case of several switches in the same direction, the first pointer 3 of the first dial 2 will thus sweep several times in the same direction over the dial 2, respectively "looping it".

On the display board 1 is a further dial 4, the position-indicating dial, is provided. On this second dial 4 further symbols are arranged at equal distances from each other, which correspond to the individual operational positions of the step switch or the like. In the embodiment example the digits 1 . . . 33 have been selected for his purpose, corresponding to the 33 possible operational positions of the motor drive and thereby of the associated step switch. Of course it is also possible to select other symbols, in the shown example with 33 possible operational positions it is also possible to use the symbols −16, −15, . . . , −1, 0, +1, . . . , +15, +16.

The individual symbols can be arranged over the entire dial or, as shown in the example, only over a part thereof.

Centrally within this second dial 4 a second pointer 5, the position-indicating pointer, is again rotatably arranged on a second pointer shaft 97 traversing the display board 1. Through the display gear mechanism 9 yet to be described it is rotated at each switch by an angle corresponding to the distance between two neighboring symbols of the second dial 4. The rotation direction of the second pointer 5 depends on the rotation direction of the motor drive in the direction "higher" or "lower". The end positions "1" and "33" shown in FIG. 1 can not be surpassed by the motor drive, therefore a further rotation of the pointer 5 beyond these symbols is not possible, this way the second pointer 5, in contrast to the previously described first pointer 3, can not sweep over its associated dial several times. Therefore, as already explained, the second dial does not have to be provided with symbols over the entire circle.

On the second pointer shaft 97 two trailing pointers 6, 7 are supported coaxially with the second pointer 5, both being rotatable, however they are not entrained by the pointer shaft 97 during its rotation.

The two trailing pointers 6, 7 are arranged on both sides of the second pointer 5, each having an entrainment tong 61, 71, both reaching into the plane of the second pointer 5.

When the second pointer 5 moves clockwise, the first trailing pointer 6 is entrained, during a counterclockwise movement of the second pointer 5, the second trailing pointer 7 is entrained. The two trailing pointers 6, 7 are supported in a self-locking manner, so that they remain in the positions to which they have been respectively entrained.

The first trailing pointer 6 marks thereby the highest operational position ever reached, the second trailing pointer 7 marks the lowest operational position ever reached. The two trailing pointers 6, 7 comprise also the heretofore used, respectively traversed control ranges and make possible a good visualized indication about the band width of the used control range on the one hand, and its relative position within the available general range on the other hand.

Both trailing pointers 6, 7 can be manually reset, so that for instance after a test run through all switching positions or after a revision, an initial state can be reestablished.

In addition it is also possible to arrange on the display board a known counting device 8, for the purpose of indicating the total number of switches.

On the underside of the display board 1 the display gear mechanism 9 is arranged which is separated in space from the controlling gear.

From the controlling gear a driving shaft 91 leads to the display gear mechanism 9, which each time the motor is switched performs a rotation of 360 degrees.

The display shaft 91 is directly connected with the second pointer shaft 97, which bears the second pointer 5. The dimensions of the gears 93 . . . 96 are thereby selected so that, at each full rotation of the driving shaft 91 which corresponds to a complete change over of the motor drive, the second pointer shaft 97 and therewith the second pointer 5 is rotated by an angle of rotation which corresponds to the distance between two symbols neighboring on the second dial 4.

Through a corresponding layout of the display gear mechanism 9 it is possible to associate the switching directions "higher", respectively "lower" of the motor drive with the rotation directions of the pointers 3, 5.

What is claimed is:

1. A position indicator for a motor drive for actuating a step switch, tap changer, or dipping coil, the position indicator comprising:

a display board having front and back faces;

a first circular array of symbols on the front face corresponding to individual switching phases traversed during changeover of the motor drive from one operational position into another neighboring operational position;

a first shaft extending through the board centrally of the first array and defining a first axis;

a pointer on the shaft at the front face rotatable about the first axis through positions aligned with the symbols;

a second circular array of symbols on the front face associated with individual possible stationary operational positions of the step switch, the tap changer, or the dipping coil;

a second shaft projecting through the board centrally of the second array and defining a second axis;

a second pointer at the front face on the second shaft rotatable about the second axis through positions aligned with the symbols of the second array;

respective trailing pointers pivotal on the second axis and not driven by the second shaft, the pointers flanking the second pointer and having entrainment formations engageable therewith, whereby as the second pointer moves and engages either of the pointers it displaces same; and means including a gear mechanism on the back face connecting the second shaft to the first shaft for movement of the second pointer angularly codirectionally with the first pointer between adjacent symbols of the second display on rotation of the first pointer through 360°.

2. The motor-drive position indicator defined in claim 1 wherein the motor drive has a controlling gear offset from the gear mechanism on the back face.

* * * * *